United States Patent
Zhang

(10) Patent No.: US 8,711,782 B2
(45) Date of Patent: Apr. 29, 2014

(54) SESSION TRANSFER METHOD, APPLICATION SERVER, AND COMMUNICATIONS SYSTEM

(71) Applicant: Huawei Technologies Co., Ltd., Guangdong (CN)

(72) Inventor: Hui Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/693,875

(22) Filed: Dec. 4, 2012

(65) Prior Publication Data

US 2013/0094495 A1   Apr. 18, 2013

Related U.S. Application Data

(63) Continuation of application No. PCT/CN2011/073900, filed on May 10, 2011.

(51) Int. Cl.
| | | |
|---|---|---|
| *H04L 12/66* | (2006.01) | |
| *H04M 3/42* | (2006.01) | |
| *H04M 7/00* | (2006.01) | |
| *H04W 4/00* | (2009.01) | |
| *H04L 12/28* | (2006.01) | |
| *H04W 40/00* | (2009.01) | |
| *G06F 15/16* | (2006.01) | |

(52) U.S. Cl.
USPC ...... 370/328; 370/352; 370/395.52; 370/401; 379/212.01; 379/220.01; 379/221.14; 455/422.1; 455/445; 709/203; 709/227

(58) Field of Classification Search
USPC .......... 370/352, 353, 354, 355, 356; 379/212, 379/220.01, 221.141
See application file for complete search history.

(56) References Cited

U.S. PATENT DOCUMENTS

2006/0280169 A1*  12/2006  Mahdi .......................... 370/352
2007/0293251 A1   12/2007  Bienas et al.

(Continued)

FOREIGN PATENT DOCUMENTS

| CN | 1801998 A | 7/2006 |
|---|---|---|
| CN | 1929457 A | 3/2007 |

(Continued)

OTHER PUBLICATIONS $1^{st}$ Office Action in corresponding Chinese Patent Application No. 201180000692.4 (Oct. 10, 2012).

(Continued)

*Primary Examiner* — Alpus H Hsu
*Assistant Examiner* — Yee Lam
(74) *Attorney, Agent, or Firm* — Leydig, Voit & Mayer, Ltd.

(57) ABSTRACT

Embodiments of the present invention relate to the field of communications and provide a session transfer method, an application server, and a communications system, which implement a cross-network session transfer between a CS domain and an IMS domain. The method includes: after receiving a session transfer request sent by user B or user C in the IMS domain, sending a release message to the user B currently in a call to terminate a session between user A in the CS domain and the user B, and negotiating media information of the user A and media information of the user C to establish a session between the user A and the user C. The embodiments of the present invention apply to a cross-network session between the CS domain and the IMS domain.

7 Claims, 6 Drawing Sheets

(56) References Cited

U.S. PATENT DOCUMENTS

| | | | |
|---|---|---|---|
| 2008/0049725 A1 | 2/2008 | Rasanen | |
| 2008/0160991 A1* | 7/2008 | Constantinof et al. | 455/426.2 |
| 2009/0052385 A1* | 2/2009 | Sylvain et al. | 370/329 |
| 2009/0257433 A1* | 10/2009 | Mutikainen et al. | 370/392 |
| 2009/0323656 A1* | 12/2009 | Mahdi | 370/338 |
| 2010/0240344 A1 | 9/2010 | Jin et al. | |
| 2011/0110275 A1* | 5/2011 | Shaheen | 370/260 |
| 2011/0188449 A1* | 8/2011 | Shaheen et al. | 370/328 |
| 2011/0270995 A1* | 11/2011 | Mutikainen et al. | 709/227 |

FOREIGN PATENT DOCUMENTS

| | | |
|---|---|---|
| CN | 101453706 A | 6/2009 |
| CN | 101459892 A | 6/2009 |
| WO | WO 2008/107898 A2 | 9/2008 |

OTHER PUBLICATIONS

International Search Report in corresponding PCT Patent Application No. PCT/CN2011/073900 (Mar. 1, 2012).

Extended European Search Report in corresponding European Patent Application No. 11765084.6 (Mar. 20, 2013).

"TR 22.973—3$^{rd}$ Generation Partnership Project; Technical Specification Group Services and System Aspects; IMS Multimedia Telephony Service and Supplementary Services; (Release 7)," Feb. 2006, V2.0.0, 3GPP, Valbonne, France.

2$^{nd}$ Office Action in corresponding Chinese Patent Application No. 20118000692.4 (Jun. 28, 2013).

\* cited by examiner

SESSION TRANSFER METHOD, APPLICATION SERVER, AND COMMUNICATIONS SYSTEM

CROSS-REFERENCE

This application is a continuation of International Patent Application No. PCT/CN2011/073900, filed on May 10, 2011, which is hereby incorporated by reference in its entirety.

FIELD OF TECHNOLOGY

The present invention relates to the field of communications, and in particular to a session transfer method, an application server, and a communications system.

BACKGROUND

An Internet Protocol (IP) Multimedia Subsystem (IP Multimedia subsystem, IMS) service has become a main orientation for mobile development and is currently capable of coupling a call in a Circuit Switched, CS, domain to an IMS side to implement a cross-network connection between the CS domain and an IMS domain.

However, a seamless transfer of a speech channel cannot be implemented currently due to the limited switching capability in the CS domain. For example, if the battery of a mobile phone runs out when the user of the mobile phone in the CS domain is in a call, it is expected to transfer the call to another terminal, or in a case in which another call transfer needs to be performed, a cross-network seamless transfer of a speech channel cannot be performed without affecting a calling party's call, thereby causing great inconvenience for user's usage.

SUMMARY

Embodiments of the present invention provide a session transfer method, an application server, and a communications system, which implement a cross-network session transfer between a CS domain and an IMS domain.

To achieve the preceding objectives, the embodiments of the present invention adopt the following technical solutions:

On one aspect, a session transfer method is provided, including:

after receiving a session transfer request sent by user B or user C in an IMS domain, sending a release message to the user B currently in a call to terminate a session between user A in a CS domain and the user B; and negotiating media information of the user A and media information of the user C to establish a session between the user A and the user C.

On one aspect, an application server is provided, including:

a session transfer receiving unit, configured to receive a session transfer request sent by user B or user C in an IMS domain;

a current session terminating unit, configured to send a release message to the user B currently in a call to terminate a session between user A in a CS domain and the user B; and a multi-leg negotiation unit, configured to negotiate media information of the user A and media information of the user C to establish a session between the user A and the user C.

On one aspect, a communications system is provided, including:

a CS domain core layer device, configured to process a call connection in a CS domain;

an IMS domain core layer device, configured to process a call connection in an IMS domain; and an application server AS, configured to, after receiving a session transfer request sent by user B or user C in the IMS domain, send a release message to the user B currently in a call to terminate a session between user A in the CS domain and the user B, and negotiate media information of the user A and media information of the user C to establish a session between the user A and the user C.

The embodiments of the present invention provide the session transfer method, the application server, and the communications system. After a session transfer request sent by user B or user C in an IMS domain is received, a release message is sent to user B currently in a call to terminate a session between user A in a CS domain and user B. Media information of user A and media information of user C are negotiated to establish a session between user A and user C. In this way, in a case in which user B needs to perform another call transfer, the session between user A in the CS domain and user B in the IMS domain can be transferred to the session between user A in the CS domain and user C in the IMS domain without affecting the calling user A. This implements a cross-network session transfer between the CS domain and the IMS domain and is convenient for user's usage.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description merely show some embodiments of the present invention, and persons of ordinary skill in the art can derive other drawings from these accompanying drawings without creative efforts.

DETAILED DESCRIPTION

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
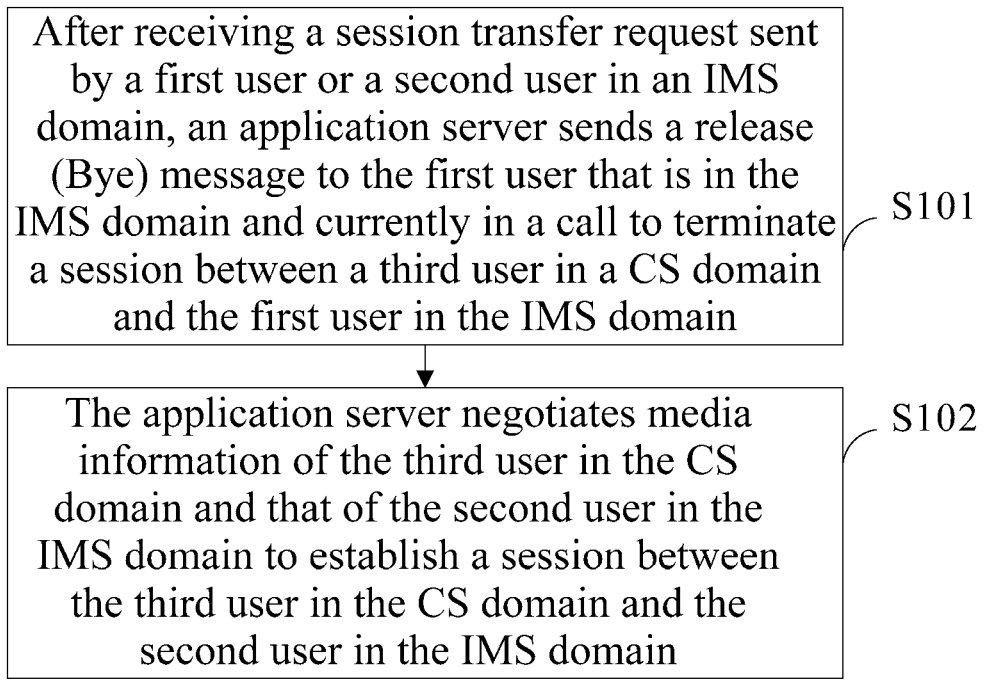
FIG. 1 is a schematic flowchart of a session transfer method according to Embodiment 1 of the present invention.

A session transfer method provided in this embodiment of the present invention, as shown in FIG. 1, includes:

S101. After receiving a session transfer request sent by a first user or a second user in an IMS domain, an application server (Application Server, AS) sends a release (Bye) message to the first user in the IMS domain that is currently in a call to terminate a session between a third user in a CS domain and the first user in the IMS domain.

S102. The application server negotiates media information of the third user in the CS domain and media information of the second user in the IMS domain to establish a session between the third user in the CS domain and the second user in the IMS domain.

According to the session transfer method provided in this embodiment of the present invention, after receiving the session transfer request sent by the first user or the second user in the IMS domain, the application server sends the release message to the first user currently in a call to terminate the session between the first user and the third user, and negotiates the media information of the third user and media information of the second user to establish the session between the third user and the second user. In this way, in a case in which the first user needs to perform another call transfer, the session between the third user in the CS domain and the first user in the IMS domain can be transferred to the session between the third user in the CS domain and the second user in the IMS domain without affecting the calling third user. This implements a cross-network session transfer between the CS domain and the IMS domain and is convenient for user's usage.

Embodiment 2

Figure 2:
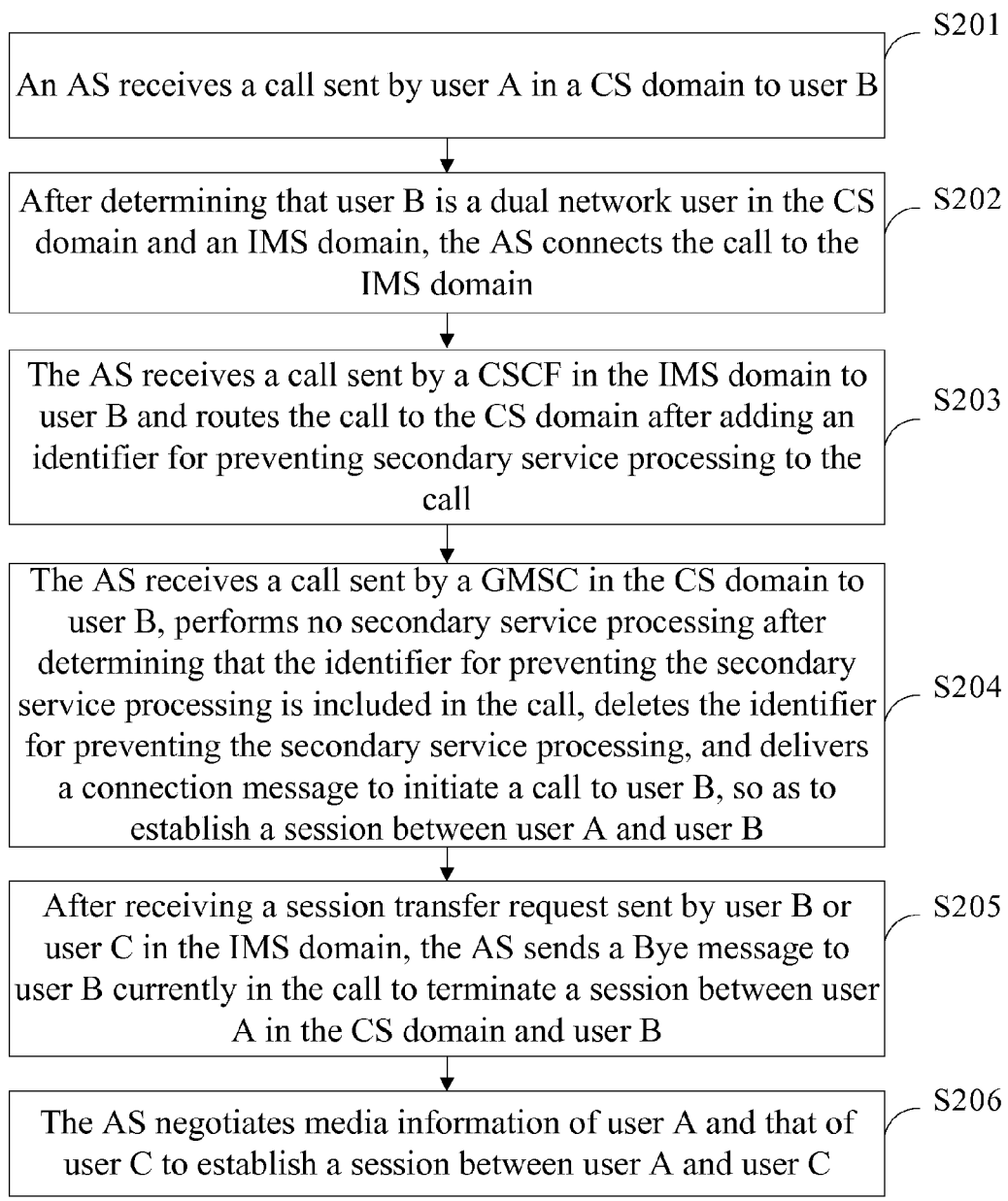
FIG. 2 is a schematic flowchart of a session transfer method according to Embodiment 2 of the present invention.

A session transfer method provided in this embodiment of the present invention, as shown in FIG. 2, includes:

S201. An AS receives a call initiated by user A in a CS domain to user B.

S202. After determining that user B is a dual network user in the CS domain and an IMS domain, the AS connects the call to the IMS domain.

S203. The AS receives a call initiated by a CSCF (Call Session Control Function, call session control function) in the IMS domain to user B and routes the call to the CS domain after adding an identifier for preventing secondary service processing to the call.

S204. The AS receives a call initiated by a GMSC (Gateway Mobile Switching Center, gateway mobile switching center) in the CS domain to user B, performs no secondary service processing after determining that the identifier for preventing the secondary service processing is included in the call, deletes the identifier for preventing the secondary service processing, and delivers a connection message to initiate a call to user B, so as to establish a session between user A and user B.

S205. After receiving a session transfer request sent by user B or user C in the IMS domain, the AS sends a Bye message to user B currently in the call to terminate a session between user A in the CS domain and user B.

S206. The AS negotiates media information of user A in the CS domain and media information of user C in the IMS domain to establish a session between user A and user C.

According to the session transfer method provided in this embodiment of the present invention, the application server is used to associate a call initiated by a user in the CS domain with the IMS domain to implement the cross-network call connection capability. In a case in which the user needs to perform a cross-network session transfer, the application server can be used to transfer the session between user A in the CS domain and user B in the IMS domain to the session between user A in the CS domain and user C in the IMS domain without affecting the calling user A. This implements a cross-network session transfer between the CS domain and the IMS domain and is convenient for user's usage.

Embodiment 3

Figure 3:
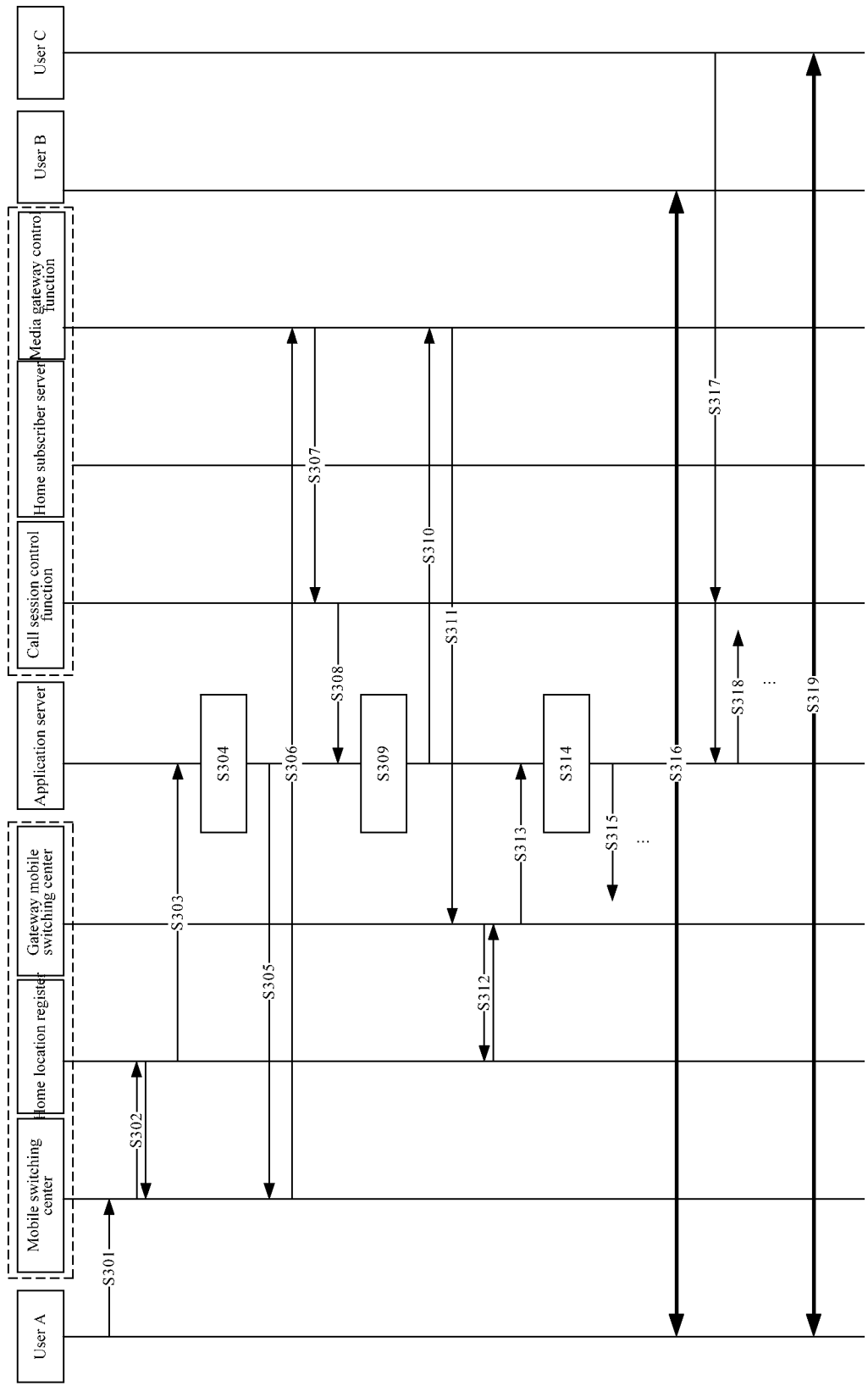
FIG. 3 is a schematic diagram of a session transfer method according to Embodiment 3 of the present invention.

The following describes a session transfer method provided in this embodiment of the present invention with reference to FIG. 3. An application scenario of this embodiment is as follows:

User A is a common user in a CS domain, user B is a user in the CS domain and registers with an IMS domain, and user C is a user in the IMS domain or a user that registers with an IMS network. The number of user A and media information of user B are homed in a same MSC (Mobile Switching Center, mobile switching center). After a session connection is established between user A and user B, user C initiates a session transfer. The session between user A and user B is transferred to a session between user A and user C.

S301. User A in the CS domain calls the called user B. This call is first sent to the MSC corresponding to the called user B.

S302. The MSC of the called user B discovers and determines, by querying an HLR (Home Location Register, home location register) and by making intelligent subscription data of a called party on the HLR by user B, that the number of user B has been registered with the AS.

S303. The MSC sends a call initiated to user B to the AS for processing. In this case, the MSC sends an IDP (Initial Detection Point, initial detection point) message to the AS.

S304. The AS receives the IDP (Initial Detection Point, initial detection point) message sent by the MSC. The AS discovers and determines, according to the number of user B and by querying internal relevant data, that user B is a dual network user in the CS domain and the IMS domain and the AS needs to send the call to the IMS domain.

S305. The AS sends a CONNECT (connect) message to the MSC, where a destination routing address is set to RN+B (destinationRoutingAddress=RN+B), RN is short for Router number, which is equivalent to an access code for CS outgoing, and B is the number of user B.

S306. The MSC maps the destinationRoutingAddress in the CONNECT message to a called party number (CalledPartyNumber) in an IAM (Initial Address Message, initial address message) and sends the IAM to an MGCF.

S307. After receiving the IAM, the MGCF deletes the RN in the CalledPartyNumber, maps the called party number B to Request URI and To labels (the mapping rule is as follows: a CalledPartyNumber in the IAM is mapped to a PAI domain in a SIP message and the CalledPartyNumber is mapped to the Request UIR domain and the TO domain), and then sends an invitation (SIP INVITE) request to a CSCF.

S308. After receiving the SIP invite request, the CSCF queries an HSS (Home Subscriber Server, home subscriber server) according to an IFC (Initial Filtering Criteria, initial filtering criteria) rule of user B and determines that the number of the called user B in the SIP INVITE request has been registered for an IMS application, where the registered IP address corresponds to an AS server. Therefore, the CSCF sends the SIP INVITE request to the AS.

S309. After receiving the SIP INVITE request sent by the CSCF, the AS adds an identifier for preventing secondary service processing to the SIP INVITE request initiated to user B to avoid the secondary service processing performed by user B in the CS domain. For example, an access code or the like is inserted in front of the calling party number A.

S310. The AS routes the call to the MGCF.

S311. The MGCF deletes a prefix code Prefix1 of the called user B and routes the call to a GMSC.

S312. The GMSC queries the HLR and discovers that user B has registered a called party intelligent subscription data message with the HLR.

S313. After the query, the GMSC sends the call initiated to user B to the AS for processing.

S314. After receiving the call, the AS determines that the identifier for preventing the secondary service processing exists in the front of the number of the calling party A to which the called party number (CalledPartyNumber) corresponds, performs no secondary service processing, and deletes the identifier for preventing the secondary service processing of A.

S315. The AS delivers the CONNECT message to initiate a call to the called user B.

S316. A session connection is established between the calling user A and the called user B.

S317. User C in the IMS domain sends a session transfer request by dialing "session connection service code+number of user A" to continue the call between user B and user A.

S318. After receiving the session transfer request sent by user C, the AS sends a Bye message to user B to terminate the current session between user A and user B.

S319. The AS negotiates media information of user A and media information of user C in the IMS domain and eventually establishes a session between user A and user C.

According to the session transfer method provided in this embodiment of the present invention, after receiving the session transfer request sent by user C in the IMS domain, the AS sends the Bye message to user B currently in the call to terminate the session between user A in the CS domain and user B, and negotiates the media information of user A and media information of user C to establish the session between user A and user C. In this way, in a case in which user B needs to perform another call transfer, the session between user A in the CS domain and user B in the IMS domain can be transferred to the session between user A in the CS domain and user C in the IMS domain without affecting the calling user A. This implements a cross-network session transfer between the CS domain and the IMS domain and is convenient for user's usage.

Embodiment 4

Figure 4:
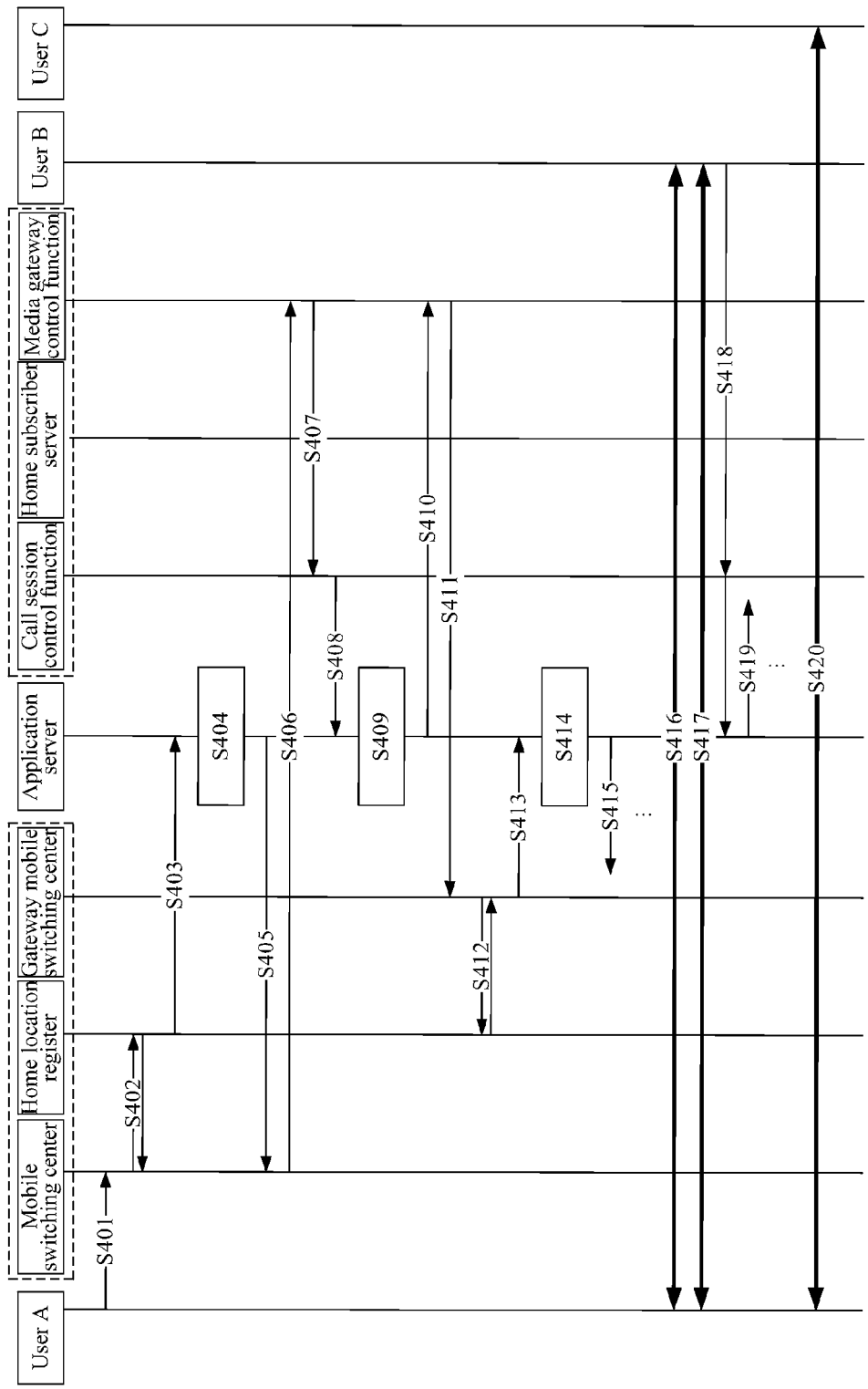
FIG. 4 is a schematic diagram of a session transfer method according to Embodiment 4 of the present invention.

The following describes a session transfer method provided in this embodiment of the present invention with reference to FIG. 4. An application scenario of this embodiment is as follows:

User A is a common user in a CS domain, user B is a user in the CS domain and registers with an IMS domain, and user C is a user in the IMS domain or a user that registers with an IMS network. The number of user A and media information of user B are homed in a same MSC (Mobile Switching Center, mobile switching center). After a session connection is established between user A and user B, user B initiates a session transfer. The session between user A and user B is transferred to a session between user A and user C.

S401 to S416 are the same as S301 to S316 respectively.

S417. Since user A and user B are still in the call, in a case in which user B initiates the session transfer, user B needs to hold user A.

S418. User B in the IMS domain sends a session transfer request by dialing "session connection service code+number of user C", so that user C continues the call between user B and user A.

S419. After receiving the session transfer request sent by user B, the AS sends a Bye message to user B to terminate the current session between user A and user B.

S420. The AS negotiates media information of user A and media information of user C and eventually establishes a session between user A and user C.

According to the session transfer method provided in this embodiment of the present invention, after receiving the session transfer request sent by user B in the IMS domain, the AS sends the Bye message to user B currently in the call to terminate the session between user A in the CS domain and user B, and negotiates the media information of user A and media information of user C to establish the session between user A and user C. In this way, in a case in which user B needs to perform another call transfer, the session between user A in the CS domain and user B in the IMS domain can be transferred to the session between user A in the CS domain and user C in the IMS domain without affecting the calling user A. This implements a cross-network session transfer between the CS domain and the IMS domain and is convenient for user's usage.

Embodiment 5

Figure 5:
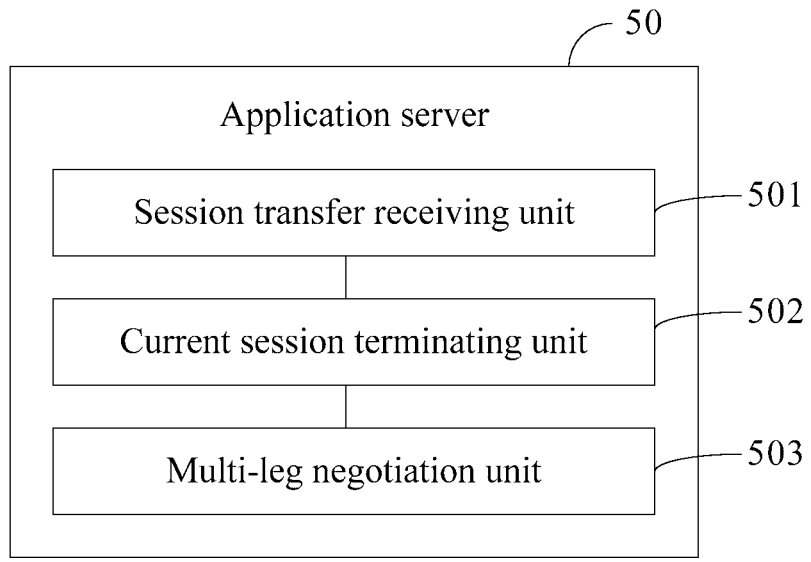
FIG. 5 is a schematic structural diagram of an application server according to Embodiment 5 of the present invention.

An application server 50 provided in this embodiment of the present invention, as shown in FIG. 5, includes:

a session transfer receiving unit 501, configured to receive a session transfer request sent by a first user or a second user in an IMS domain;

a current session terminating unit 502, configured to send a release message to the first user in the IMS domain that is currently in a call to terminate a session between a third user in a CS domain and the first user in the IMS domain; and a multi-leg negotiation unit 503, configured to negotiate media information of the third user in the CS domain and media information of the second user in the IMS domain to establish a session between the third user and the second user.

After receiving the session transfer request sent by the first user or the second user in the IMS domain, the application server provided in this embodiment of the present invention sends the release message to the first user currently in the call to terminate the session between the first user and the third user, and negotiates the media information of the third user and media information of the second user to establish the session between the third user and the second user. In this way, in a case in which the first user needs to perform another call transfer, the session between the third user in the CS domain and the first user in the IMS domain can be transferred to the session between the third user in the CS domain and the second user in the IMS domain without affecting the calling third user. This implements a cross-network session transfer between the CS domain and the IMS domain and is convenient for user's usage.

Figure 6:
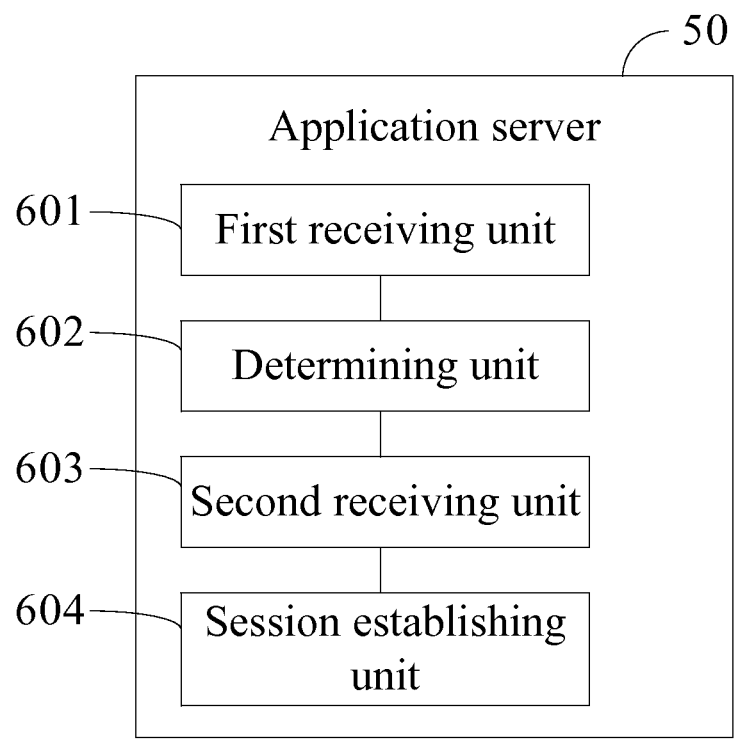
FIG. 6 is another schematic structural diagram of the application server according to Embodiment 5 of the present invention.

Further, as shown in FIG. 6, the application server 50 includes:

a first receiving unit 601, configured to receive a call initiated by the third user in the CS domain to the first user;

a determining unit 602, configured to connect the call to the IMS domain after determining that the first user is a dual network user in the CS domain and the IMS domain;

a second receiving unit 603, configured to receive a call sent by a Call Session Control Function CSCF in the IMS domain to the first user and route the call to the CS domain after adding an identifier for preventing secondary service processing to the call; and a session establishing unit 604, configured to receive a call sent by a gateway mobile switching center GMSC in the CS domain to the first user, perform no secondary service processing after determining that the identifier for preventing the secondary service processing is included in the call, delete the identifier for preventing the secondary service processing, and deliver a connection message to initiate a call to the first user, so as to establish the session between the third user and the first user.

Embodiment 6

Figure 7:
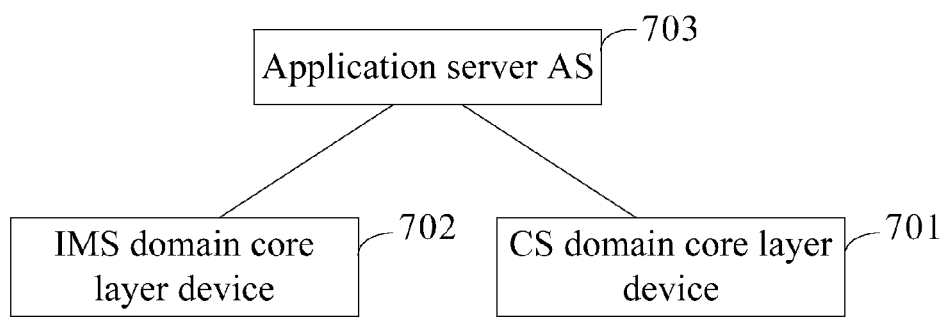
FIG. 7 is a schematic constructional diagram of a communications system according to Embodiment 6 of the present invention.

A communications system provided in Embodiment 6 of the present invention, as shown in FIG. 7, includes:

a CS domain core layer device 701, configured to process a call connection in a CS domain;

an IMS domain core layer device 702, configured to process a call connection in an IMS domain; and an application server AS 703, configured to, after receiving a session transfer request sent by a first user or a second user in the IMS domain, send a release message to the first user in the IMS domain that is currently in a call to terminate a session between a third user in the CS domain and the first user in the IMS domain, and negotiate media information of the third user in the CS domain and media information of the second user in the IMS domain to establish a session between the third user and the second user.

According to the communications system provided in this embodiment of the present invention, after receiving the session transfer request sent by the first user or the second user in the IMS domain, the AS sends the release message to the first user currently in the call to terminate the session between the first user and the third user, and negotiates the media information of the third user and media information of the second user to establish the session between the third user and the second user. In this way, in a case in which the first user needs to perform another call transfer, the session between the third user in the CS domain and the first user in the IMS domain can be transferred to the session between the third user in the CS domain and the second user in the IMS domain without affecting the calling third user. This implements a cross-network session transfer between the CS domain and the IMS domain and is convenient for user's usage.

Figure 8:
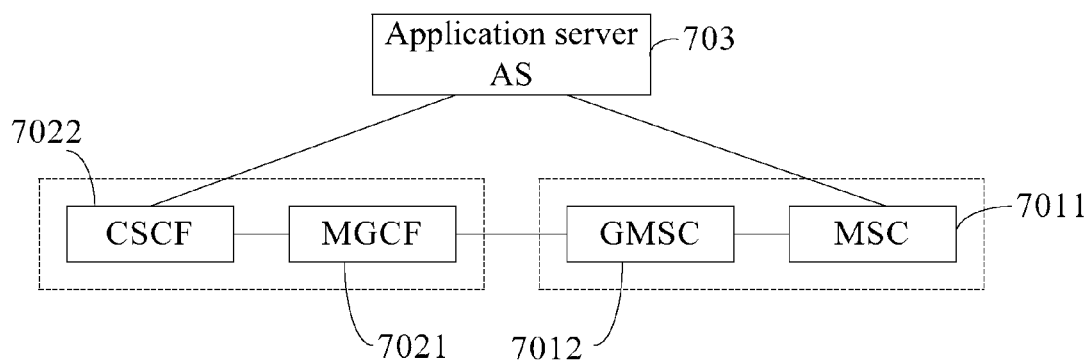
FIG. 8 is another schematic constructional diagram of the communications system according to Embodiment 6 of the present invention.

Further, as shown in FIG. 8, the CS domain core layer device 701 includes:

a mobile switching center MSC 7011, configured to send a call initiated by the third user to the first user to the AS 703, receive a connection message sent by the AS, where a destination address in the connection message is an access code RN for CS outgoing and the number of the called first user, map the destination address in the connection message to a called party number in an initial address message IAM, and send the IAM message IAM to a Media Gateway Control Function MGCF 7021; and a gateway mobile switching center GMSC 7012, configured to receive a call sent by the MGCF 7021 to the first user and send the call to the AS 703.

In addition, the IMS domain core layer device 702 includes:

the MGCF 7021, configured to receive the IAM sent by the MSC 7011, send an invitation request to a Call Session Control Function CSCF 7022, receive a call sent by the AS 703 to the first user, and send the call to the GMSC 7012; and the Call Session Control Function CSCF 7022, configured to receive the invitation request sent by the MGCF 7021 and send a call to the first user to the AS 703.

It can be clearly understood by persons skilled in the art that, for the purpose of convenient and brief description, for a detailed working process of the foregoing system, apparatus, and unit, reference may be made to the corresponding process in the method embodiments, and the details are not described herein again.

In the embodiments provided in the present application, it should be understood that the disclosed apparatus, method, and system may be implemented in other modes. For example, the described apparatus embodiments are merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to the actual needs to achieve the objectives of the solutions of the embodiments.

In addition, functional units in the embodiments of the present invention may be integrated into a processing unit, or each of the units may exist alone physically, or two or more units are integrated into a unit. The integrated unit may be implemented in a form of hardware, or may be implemented in a form of a software functional unit.

When being implemented in the form of a software functional unit and sold or used as a separate product, the integrated unit may be stored in a computer-readable storage medium. Based on such understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, a network device, and the like) to execute all or a part of steps of the methods described in the embodiments of the present invention. The storage medium includes: any medium that can store program codes, such as a U-disk, a removable hard disk, a read-only memory (ROM, Read-Only Memory), a random access memory (RAM, Random Access Memory), a magnetic disk, and an optical disk.

The foregoing descriptions are merely exemplary embodiments of the present invention, but not intended to limit the protection scope of the present invention. Any variation or replacement made by persons skilled in the art within the technical scope disclosed in the present invention shall all fall within the protection scope of the present invention. Therefore, the protection scope of the present invention shall be subject to the protection scope of the appended claims.

What is claimed is:

1. A session transfer method, comprising:
after receiving a session transfer request sent by a first user or a second user, wherein the second user is in an Internet Protocol multimedia subsystem (IMS) domain, sending, by an application server (AS), a release message to the first user in the IMS domain that is currently in a first call with a third user which is in a circuit switched (CS) domain to terminate a session between the third user in the CS domain and the first user in the IMS domain;
negotiating, by the AS, media information of the third user in the CS domain and media information of the second user in the IMS domain to establish a session between the third user and the second user;
wherein before the receiving the session transfer request sent by the first user or the second user, the method further comprising:
receiving, by the AS, the first call initiated by the third user in the CS domain to the first user;
connecting, by the AS, the first call to the IMS domain after determining that the first user is a dual network user in the CS domain and the IMS domain by querying internal relevant data according to a number of the first user upon receiving an Initial Detection Point (IDP) message sent by a Mobile Switching Center (MSC) of the first user;
receiving, by the AS, a second call sent by a Call Session Control Function (CSCF) in the IMS domain to the first user and routing the second call to the CS domain after adding an access code for preventing repeating a service processing that has been performed by the AS to the first call; and
receiving, by the AS, a third call sent by a gateway mobile switching center (GMSC) in the CS domain to the first user, performing no service processing that has been performed by the AS after determining that the access code for preventing repeating the service processing that has been performed by the AS is comprised in the third call, deleting the access code for preventing repeating the service processing that has been performed by the AS, and delivering a connection message to initiate the first call to the first user, so as to establish the session between the third user and the first user.

2. The method according to claim 1, wherein
the session transfer request sent by the first user comprises: a first session connection service code and a number of the second user;
the session transfer request sent by the second user comprises: a second session connection service code and a number of the third user;
the sending the release message to the first user in the IMS domain that is currently in the first call to terminate the session between the third user in the CS domain and the first user in the IMS domain comprises:
determining that the first user is in a current session and sending the release message to the first user in the IMS domain that is currently in the first call to terminate the session between the third user in the CS domain and the first user in the IMS domain; and
determining that the second user is not in the current session and sending the release message to the first user in the IMS domain that is currently in the first call to terminate the session between the third user in the circuit switched CS domain and the first user in the IMS domain.

3. The method according to claim 2, wherein when the first user initiates the session transfer request, holding the first call between the first user and the third user before the determining that the first user is in the current session.

4. The method according to claim 1, wherein the connecting the first call to the IMS domain after determining that the first user is the dual network user in the CS domain and the IMS domain comprises:
after determining that the first user is the dual network user in the CS domain and the IMS domain, sending the connection message to the MSC, wherein a destination address in the connection message is an access code for CS outgoing and the number of the first user, so that the first call is connected to the IMS domain according to the destination address.

5. An application server, comprising:
a session transfer receiving unit, configured to receive a session transfer request sent by a first user or a second user, wherein the second user is in an Internet Protocol multimedia subsystem (IMS) domain;
a current session terminating unit, configured to send a release message to the first user in the IMS domain that is currently in a first call with a third user which is in a circuit switched (CS) domain to terminate a session between the third user in the CS domain and the first user in the IMS domain;
a multi-leg negotiation unit, configured to negotiate media information of the third user in the CS domain and media information of the second user in the IMS domain to establish a session between the third user and the second user;
a first receiving unit, configured to receive the first call initiated by the third user in the CS domain to the first user;
a determining unit, configured to connect the first call to the IMS domain after determining that the first user is a dual network user in the CS domain and the IMS domain by querying internal relevant data according to a number of the first user upon receiving an Initial Detection Point (IDP) message sent by a Mobile Switching Center (MSC) of the first user;
a second receiving unit, configured to receive a second call sent by a call session control function (CSCF) in the IMS domain to the first user and route the second call to the CS domain after adding an access code for preventing repeating a service processing that has been performed by the AS to the first call; and
a session establishing unit, configured to receive a third call sent by a gateway mobile switching center (GMSC) in the CS domain to the first user, perform no service processing that has been performed by the AS after determining that the access code for preventing repeating the service processing that has been performed by the AS is comprised in the third call, delete the access code for preventing repeating the service processing that has been performed by the AS, and deliver a connection message to initiate the first call to the first user, so as to establish the session between the third user and the first user.

6. A communications system, comprising:
a circuit switched (CS) domain core layer device, configured to process a call connection in a CS domain;
an Internet Protocol multimedia subsystem (IMS) domain core layer device, configured to process a call connection in an IMS domain;

an application server (AS), configured to, after receiving a session transfer request sent by a first user or a second user, wherein the second user is in the IMS domain, send a release message to the first user in the IMS domain that is currently in a call with a third user which is in the CS domain to terminate a session between the third user in the CS domain and the first user in the IMS domain, and negotiate media information of the third user in the CS domain and media information of the second user in the IMS domain to establish a session between the third user and the second user; and before the receiving the session transfer request send by the first or second user, connect the call to the IMS domain after determining that the first user is a dual network user in the CS domain and the IMS domain by querying internal relevant data according to the number of the first user upon receiving an Initial Detection Point (IDP) message sent by a Mobile Switching Center (MSC) of the first user; and receive a first call sent by a Call Session Control Function (CSCF) in the IMS domain to the first user and routing the first call to the CS domain after adding an access code for preventing repeating a service processing that has been performed by the AS to the call;

wherein the CS domain core layer device comprises:

a mobile switching center (MSC), configured to send a call initiated by the third user to the first user to the AS, receive a connection message sent by the AS, wherein a destination address in the connection message is an access code RN for CS outgoing and a number of the called first user, map the destination address in the connection message to a called party number in an initial address message (IAM), and send the IAM to a Media Gateway Control Function (MGCF); and a gateway mobile switching center (GMSC), configured to receive a call sent by the MGCF to the first user and send the call to the AS.

7. The system according to claim 6, wherein the IMS domain core layer device comprises:

the MGCF, configured to receive the IAM sent by the MSC, send an invitation request to a call session control function (CSCF), receive a call sent by the AS to the first user, and send the call to the GMSC; and the CSCF, configured to receive the invitation request sent by the MGCF and send a call to the first user to the AS.

\* \* \* \* \*

UNITED STATES PATENT AND TRADEMARK OFFICE
CERTIFICATE OF CORRECTION

| | | |
|---|---|---|
| PATENT NO. | : 8,711,782 B2 | Page 1 of 1 |
| APPLICATION NO. | : 13/693875 | |
| DATED | : April 29, 2014 | |
| INVENTOR(S) | : Zhang | |

It is certified that error appears in the above-identified patent and that said Letters Patent is hereby corrected as shown below:

*On the Title page, item (71) Applicant's City of Residence "Guangdong (CN)" should read -- Shenzhen (CN) --.*

Signed and Sealed this
Ninth Day of September, 2014

Michelle K. Lee
*Deputy Director of the United States Patent and Trademark Office*